United States Patent
Kang et al.

(10) Patent No.: US 6,498,774 B2
(45) Date of Patent: Dec. 24, 2002

(54) DISK TRAY LOCKING DEVICE FOR AN OPTICAL SYSTEM

(75) Inventors: Seong Sik Kang, Suwon-shi (KR); Tae Hyong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/153,802

(22) Filed: May 24, 2002

(65) Prior Publication Data

US 2002/0136141 A1 Sep. 26, 2002

Related U.S. Application Data

(63) Continuation of application No. 09/927,400, filed on Aug. 13, 2001, now Pat. No. 6,449,233, which is a continuation of application No. 08/928,639, filed on Sep. 12, 1997, now Pat. No. 6,459,671.

(30) Foreign Application Priority Data

Sep. 12, 1996 (KR) ............................................ 96-39474

(51) Int. Cl.[7] ............................................. G11B 33/02
(52) U.S. Cl. ..................................................... 369/75.2
(58) Field of Search .............................. 369/75.1, 75.2, 369/77.1, 77.2

(56) References Cited

U.S. PATENT DOCUMENTS

| | | | | |
|---|---|---|---|---|
| 5,204,850 A | | 4/1993 | Obata ......................... | 369/75.2 |
| 5,218,593 A | | 6/1993 | Kaneo et al. ............... | 369/77.1 |
| 5,504,729 A | | 4/1996 | Ikedo et al. ................ | 369/75.1 |
| 5,608,705 A | | 3/1997 | Tanaka ....................... | 369/77.1 |
| 5,682,370 A | * | 10/1997 | Lee et al. ................... | 369/75.2 |
| 5,691,969 A | | 11/1997 | Fujisawa .................... | 369/77.1 |
| 5,781,523 A | | 7/1998 | Ozawa et al. .............. | 369/77.1 |
| 5,793,729 A | | 8/1998 | Soga et al. ................. | 369/77.1 |
| 5,881,040 A | | 3/1999 | Niioka et al. .............. | 369/75.2 |
| 6,222,811 B1 | | 4/2001 | Sakurai et al. ............. | 369/77.1 |
| 6,256,280 B1 | | 7/2001 | Sakurai et al. ............. | 369/77.1 |
| 6,272,093 B1 | | 8/2001 | Kurozuka et al. ......... | 369/77.2 |
| 6,335,914 B2 | * | 1/2002 | Tanaka et al. ............. | 369/77.1 |

FOREIGN PATENT DOCUMENTS

| | | |
|---|---|---|
| EP | 0416797 A2 | 3/1991 |
| EP | 0521217 A | 1/1993 |
| EP | 0548465 A | 6/1993 |
| EP | 0698882 A | 2/1996 |
| JP | 5166281 | 7/1993 |
| WO | 9508172 | 3/1995 |

OTHER PUBLICATIONS

JP 60–35353 (Mar. 11, 1985) with English language translation of a claim.

* cited by examiner

*Primary Examiner*—Robert S. Tupper
*Assistant Examiner*—Julie Anne Watko
(74) *Attorney, Agent, or Firm*—Birch, Stewart, Kolasch & Birch, LLP

(57) ABSTRACT

A disk tray shifting device for an optical disk player includes a bracket movable along the cross direction of a main base. The device includes a main base having a guide member, an up-down pivoting base secured to the main base, the up-down pivoting base having a protrusion projecting from one end thereof, a tray movable between a loaded position and an ejected position, and a bracket movable along the guide member in at least in a transverse direction with respect to a moving direction of the tray. The guide member is arranged in the cross direction of the main base. In one embodiment, a loading motor is attached to the bottom of the bracket, and a power transmission is installed on the bracket. It is possible to construct the disk tray shifting device simply and compactly by installing the loading motor and the power transmission in a single bracket.

20 Claims, 14 Drawing Sheets

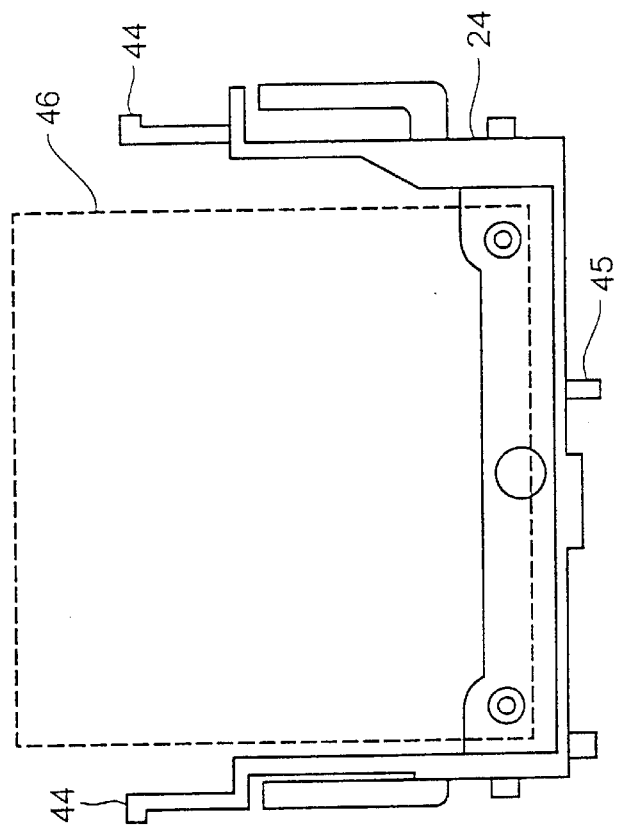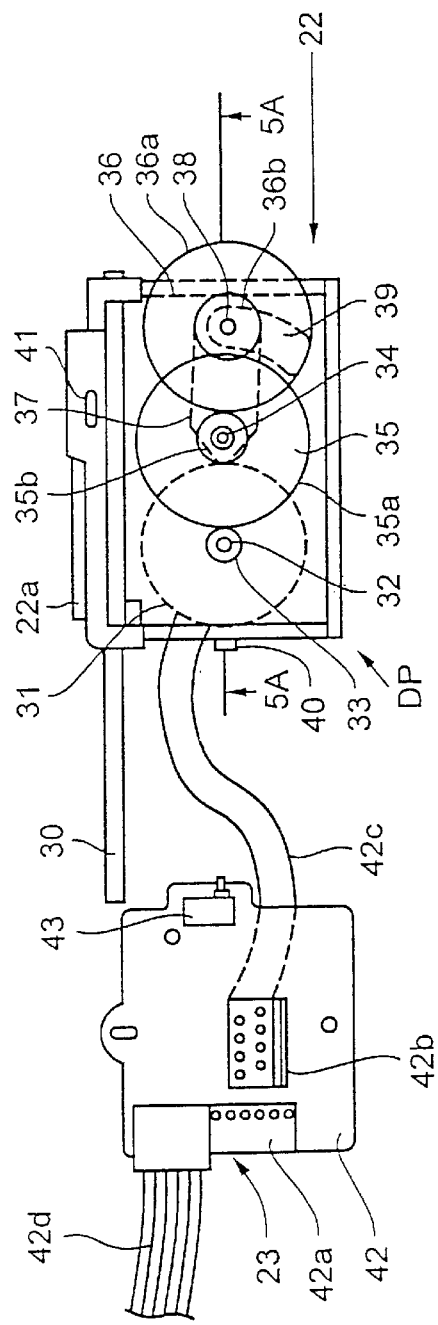
FIG. 4A
FIG. 4B

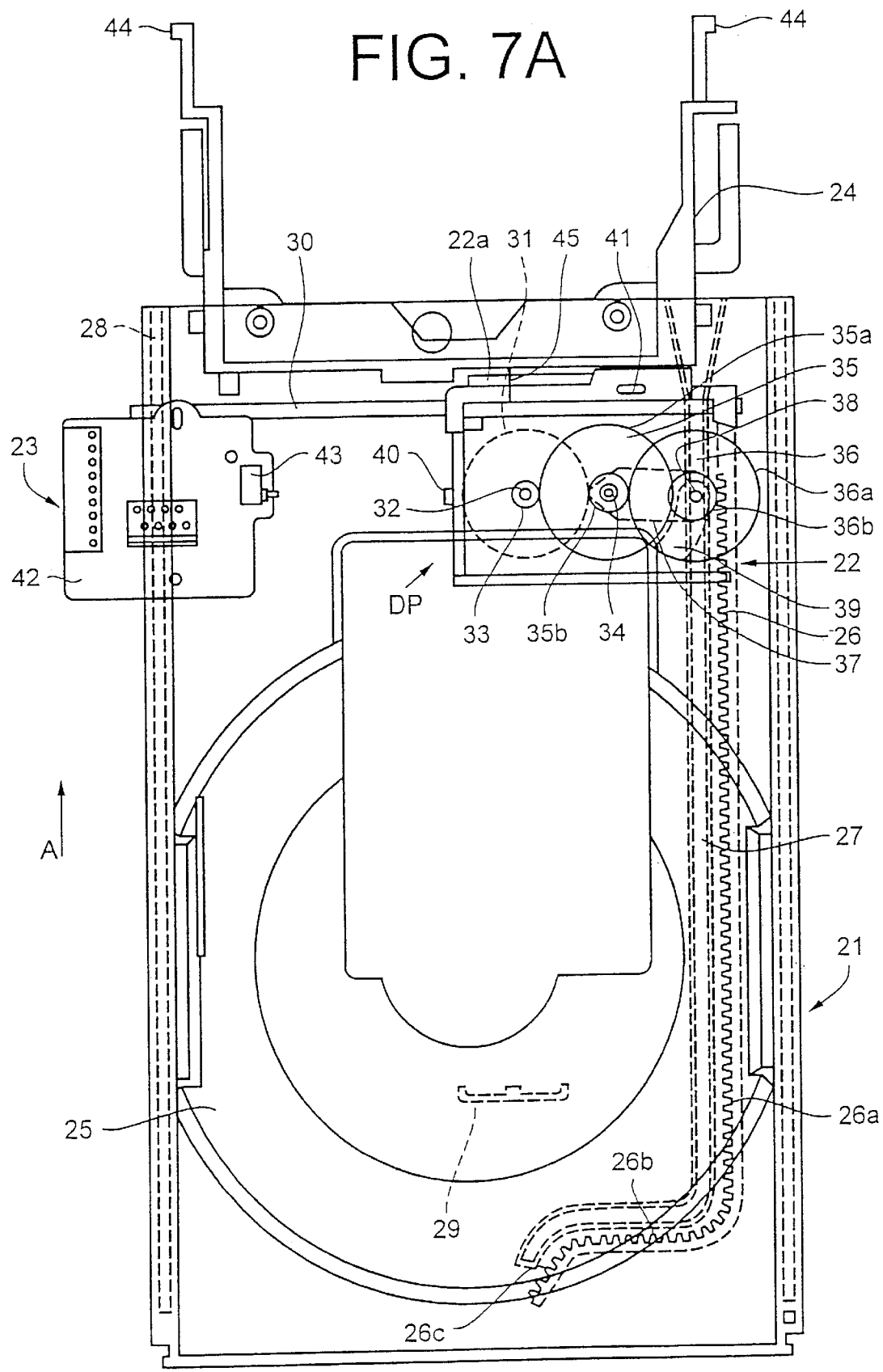

DISK TRAY LOCKING DEVICE FOR AN OPTICAL SYSTEM

This application is a continuation of application Ser. No. 09/927,400, filed on Aug. 13, 2001, now U.S. Pat. No. 6,449,233, which is a continuation of application Ser. No. 08/928,639, filed on Sep. 12, 1997, now U.S. Pat. No. 6,459,671, the entire contents of each of which are hereby incorporated by reference and for which priority is claimed under 35 U.S.C. §120, and this application claims priority of Application No. 1996-39474 filed in Korea on Sep. 12, 1996 under 35 U.S.C. §119.

BACKGROUND OF THE INVENTION

1. Field of the Invention

The present invention relates to a disk loading device for an optical disk player, for example, a compact disk player or a digital video disk player. One embodiment particularly relates to a disk tray shifting device wherein a loading motor for shifting the disk tray is installed movably along the cross direction of a main base, so that the device becomes compact and the reliability of power transmission thereof is improved.

2. Description of the Prior Art

A conventional optical disk player includes a disk tray for accommodating a disk, and a pickup for reading data recorded on the disk. A conventional optical disk player also includes a disk loading device including a loading motor for shifting the disk tray from the outside of the player body to the inside thereof or from the inside of the body to the outside thereof that is mounted on one end of the main base, and a pickup driving motor for sliding the pickup that is mounted on the other end of the main base.

In the conventional disk loading device as described above, generally, a rack portion is formed on the underside of the disk tray, and a pinion to be rotated by the driving force transmitted from the loading motor is engaged with the rack portion. By this engagement between the rack portion and the pinion, the relative motion of the disk toward a turntable mounted on the pickup base is performed, so that the loading operation or the unloading operation is accomplished. Hereinafter, the structure and the operation of the conventional disk tray shifting device will be described in detail with reference to FIG. 1 through FIG. 3 of the appended drawings.

FIG. 1 is a perspective view showing an external appearance of an optical disk player, FIG. 2 is a schematic top view showing a disk tray shifting device of the player, and FIG. 3 is a schematic front view of the disk tray shifting device. In the conventional disk tray shifting device as shown in FIG. 1 through FIG. 3, a loading motor 2 is mounted on one end of the front portion of a main base installed inside of a player body 20, and the driving force of the motor 2 is transmitted to an idler gear 7 through a pulley 4 mounted on the upper end of the motor 2, a belt 3 and a gear train. The gear train consists of a first gear 5 and a second gear 6, and the idler gear 7 includes a pinion 7a on the upper portion thereof, wherein the pinion 7a is formed integrally with the idler gear 7.

Referring to FIG. 2 and FIG. 3, an L-shaped arm 9 is inserted pivotably on the shaft 8 of the second gear 6, the idler gear 7 is inserted rotatably on the shaft 9a formed on the first end portion 9b of the arm 9, and a guide protrusion 10 is projected from the underside of the second end portion 9c. On the lower end of the shaft 8, a cylindrical cam 11 having a cam groove 11a engraved on the surface thereof is fixedly mounted, and the lower end of the guide protrusion 10 is inserted into a dimple 11d formed on the upper surface of the cam 11 through a curved shape guide slit 12. The guide slit 12 is formed on the main base 1.

On the other hand, on the underside of a disk tray 13, there is provided a rack portion 14 along the longitudinal direction of the tray 13, and the rack portion 14 is engaged with the pinion 7a formed integrally with the idler gear 7. The rack portion consists of a linear-shaped rack portion 14a and a curved shape rack portion 14b.

In FIG. 3, the reference number 15 indicates a protrusion, which is formed on the front end of an up-down pivoting base (not shown) and which is inserted into the cam groove 11a of the cam 11. The up-down pivoting base is pivotably mounted on the main base 1, and supports one side of the pickup base not shown in FIGS. 1–3.

Now the loading operation of the disk tray shifting device will be described.

Firstly, when the disk tray 13 is shifted outwards from the inside of the player, the disk D is placed on the tray 13. Thereafter, if the loading signal is applied to the disk tray shifting device, the loading motor 2 is actuated so that the pulley 4 mounted on the shaft of the motor 2 is rotated clockwise. At this time, since the driving force of the motor 2 is transmitted to the pinion 7a through the belt 3, the first gear 5, the second gear 6 and the idler gear 7, the pinion 7a engaged with the rack portion 14 is rotated clockwise, so that the disk tray 13 is shifted to the loading position. That is, when the pinion 7a is rotated clockwise by the driving force transmitted from the loading motor 2, the disk tray 13 having the rack portion engaged with the pinion 7a is shifted along the arrow direction, as shown in FIG. 2. Such shifting operation of the disk tray 13 is finished when the end portion of the linear-shaped rack portion 14a reaches the pinion 7a. Thereafter, when the tray 13 is shifted, the operation for placing the disk D on the turntable is continued.

When the shift operation of the tray 13 is finished, if the pinion 7a continues to rotate, the arm 9 is rotated counter-clockwise on the shaft 8 by the rotation of the pinion 7a, and the pinion 7a is moved along the curved shape rack portion 14b. Thus, the guide protrusion projected from the underside of the second end portion 9c of the arm 9 is also moved counterclockwise along the guide slit 12.

At this time, the cam 11 is rotated on the shaft 8 because the lower end of the guide protrusion 10 is inserted into a dimple lid formed on the upper surface of the cam 11. Accordingly, the protrusion 15, which is formed on the front end of the up-down pivoting base and placed in the first position 11b of the cam groove 11a, is moved along the cam groove 11a towards the second position 11c of the cam groove 11a. Therefore, the pickup base is moved upwards, and the disk D placed on the tray 13 is loaded on the turntable of the spindle motor, not shown. Here, the first position 11b of the cam groove 11a indicates the position of the protrusion 15 when the center hole of the disk D is not inserted on the shaft of the turntable, and the second position 11c of the cam groove 11a indicates the position of the protrusion 15 when the center hole of the disk D is inserted on the shaft of the turntable.

The unloading operation of the disk tray shifting device is performed according to the reverse order of the loading operation.

However, in the above described conventional disk tray shifting device, a large number of components are necessary in order to achieve power transmission from the loading motor to the pinion. And since the rotating radius of the idler gear and the space occupied with the belt are large, it is necessary to provide a large space for mounting the idler gear and the belt. Therefore, there are problems in miniaturization of the power transmission means and in the accuracy of the power transmission.

In addition, although not shown in FIGS. 1–3, it is necessary to provide a separate locking device in order to prevent the tray from moving freely after a loading operation in the conventional disk tray shifting device. However, the need for such a separate device also inhibits the miniaturization of the shifting device.

SUMMARY OF THE INVENTION

It is an object of the present invention to provide a novel disk tray shifting device for the optical disk player in which a loading motor for shifting the disk tray with respect to a turntable is mounted movably in the cross direction of a main base in order to minimize the installation space of components.

Another object of the present invention is to provide a disk tray shifting device which can transmit the driving force of a loading motor to the disk tray by minimizing power transmission stages so as to control the shifting operation of the disk tray precisely.

A further object of the present invention is to provide a disk tray shifting device which is compactly and simply constructed by installing the loading motor and the power transmission means in a single bracket and by minimizing the installation gap between components.

Another object of the present invention is to provide a disk tray shifting device which is able to improve the assembling workability and to interchange the components easily by the compact construction.

Still another object of the present invention is to provide a disk tray shifting device in which a locking device for preventing the tray from moving freely after a loading operation is formed on the bracket so as to accomplish a loading operation and a locking operation simultaneously.

A further object of the present invention is to provide a disk tray shifting device in which the upward movement of a pickup base and the crosswise movement of the loading motor can be accomplished together.

Another object of the present invention is to provide a disk tray shifting device wherein a cable for supplying electrical signals to the loading motor can be easily connected without any interference between other components.

Still another object of the present invention is to provide a disk tray shifting device wherein a sensor for detecting the position of the loading motor is simply constructed, and yet wherein a signal transmission device for supplying electrical signals to a spindle motor and the like is compactly and simply connected.

These objects are achieved according to the present invention by providing one embodiment of a disk tray shifting device which is arranged in the optical disk player, and which comprises: a main base; a guide bar arranged on the main base along the cross direction of the main base; a bracket mounted slidably on the guide bar and being moved along the guide bar, wherein the bracket includes a guide groove on one side thereof; a loading motor attached to the bottom of the bracket; a tray including a rack portion formed on the underside thereof, a power transmission device installed on the bracket and transmitting the driving force of the loading motor to the tray, wherein the power transmission device includes an intermediate gear and an idler gear; and a circuit portion mounted on one side of the main base.

In the present invention, the rack portion formed on the underside of the tray includes a longitudinal rack formed along the longitudinal direction of the tray and a lateral rack formed along the cross direction of the tray. Therefore, when a pinion projected from the upper surface of the idler gear is engaged with the longitudinal rack and that pinion begins to rotate, the tray is shifted along the longitudinal direction of the main base. Furthermore, when the pinion is engaged with the lateral rack and that pinion begins to rotate, the bracket is moved along the guide bar in the cross direction of the main base.

When the bracket is moved along the guide bar, an up-down pivoting base supporting one side of a pickup base is pivoted on the shaft upwards or downwards. Thus, a turntable mounted on the pickup base is either inserted into the center hole of the disk, or removed from the center hole.

And when the bracket is moved along the cross direction of the main base, a locking device formed on the bracket is put into contact with a stopper formed on the underside of the tray in order to prevent the tray from moving freely.

In addition, the circuit portion and the loading motor are interconnected with the signal transmission device, and the circuit portion includes a sensor for detecting the position of the bracket.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 4A–4C are exploded schematic top views showing a disk tray shifting device in accordance with one embodiment of the present invention;

FIG. 7A is a schematic top view showing the unloading state of the disk tray shifting device in accordance with the present invention;

DETAILED DESCRIPTION OF THE PREFERRED EMBODIMENT

Figure 1:
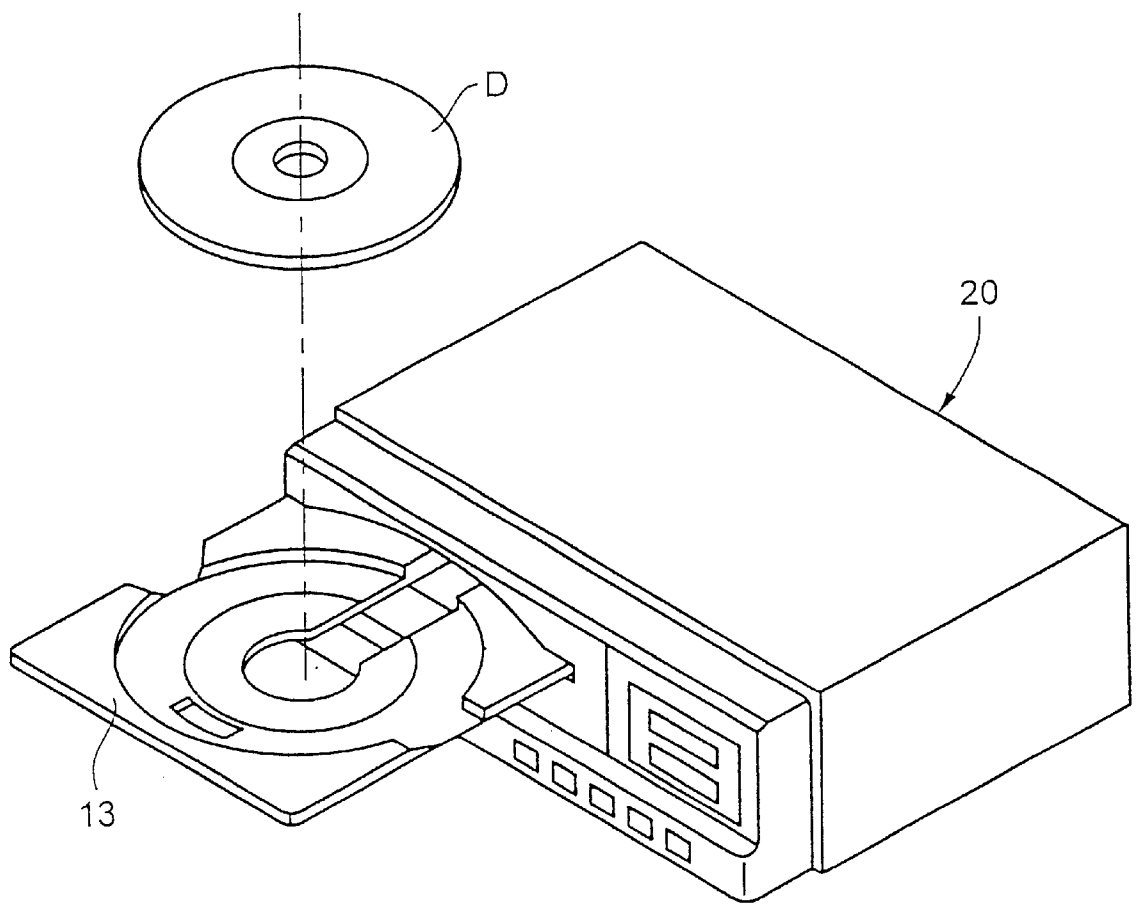
FIG. 1 is a perspective view showing an external appearance of a conventional optical disk player.
Figure 2:
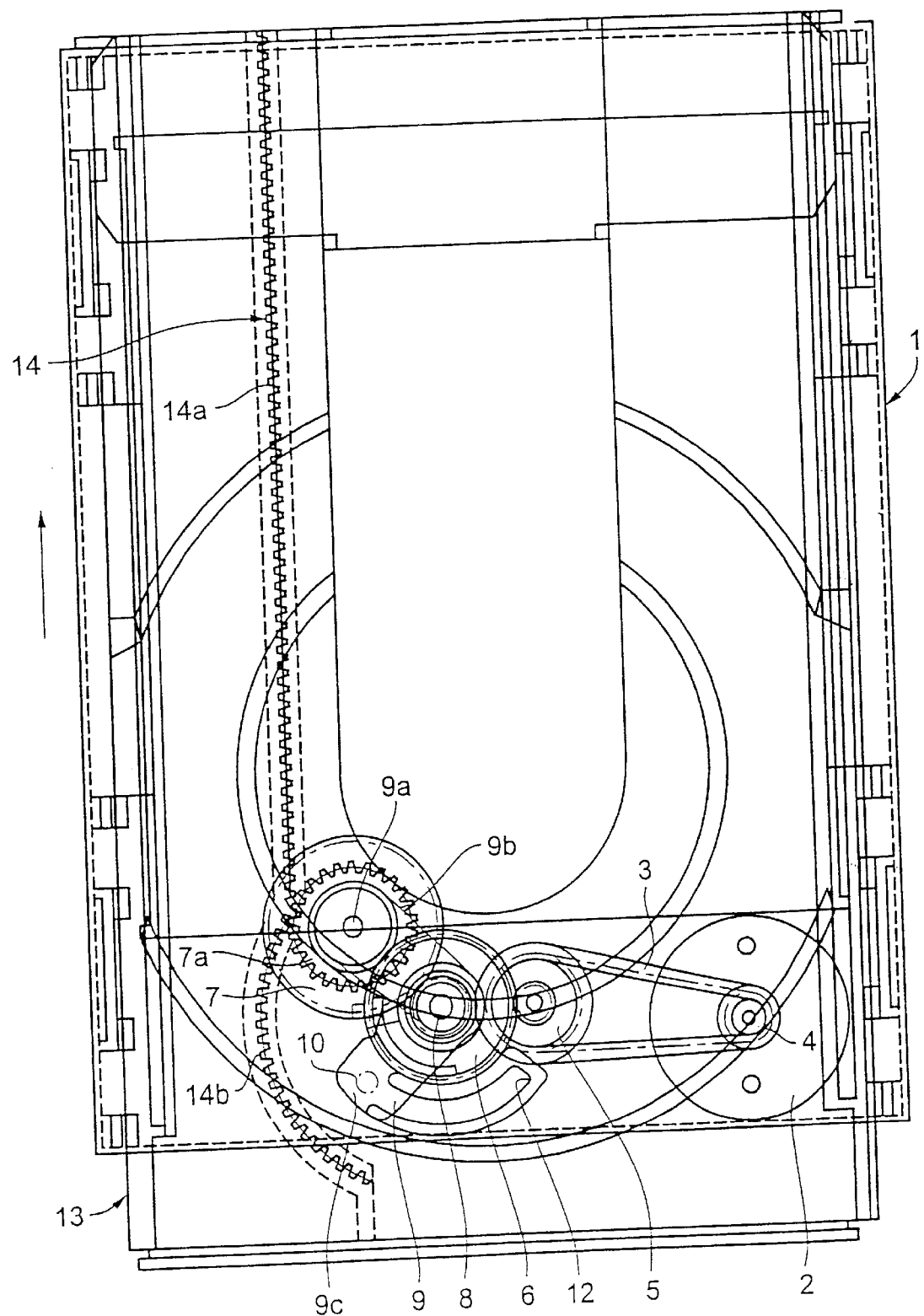
FIG. 2 is a schematic top view showing a conventional disk tray shifting device.
Figure 3:
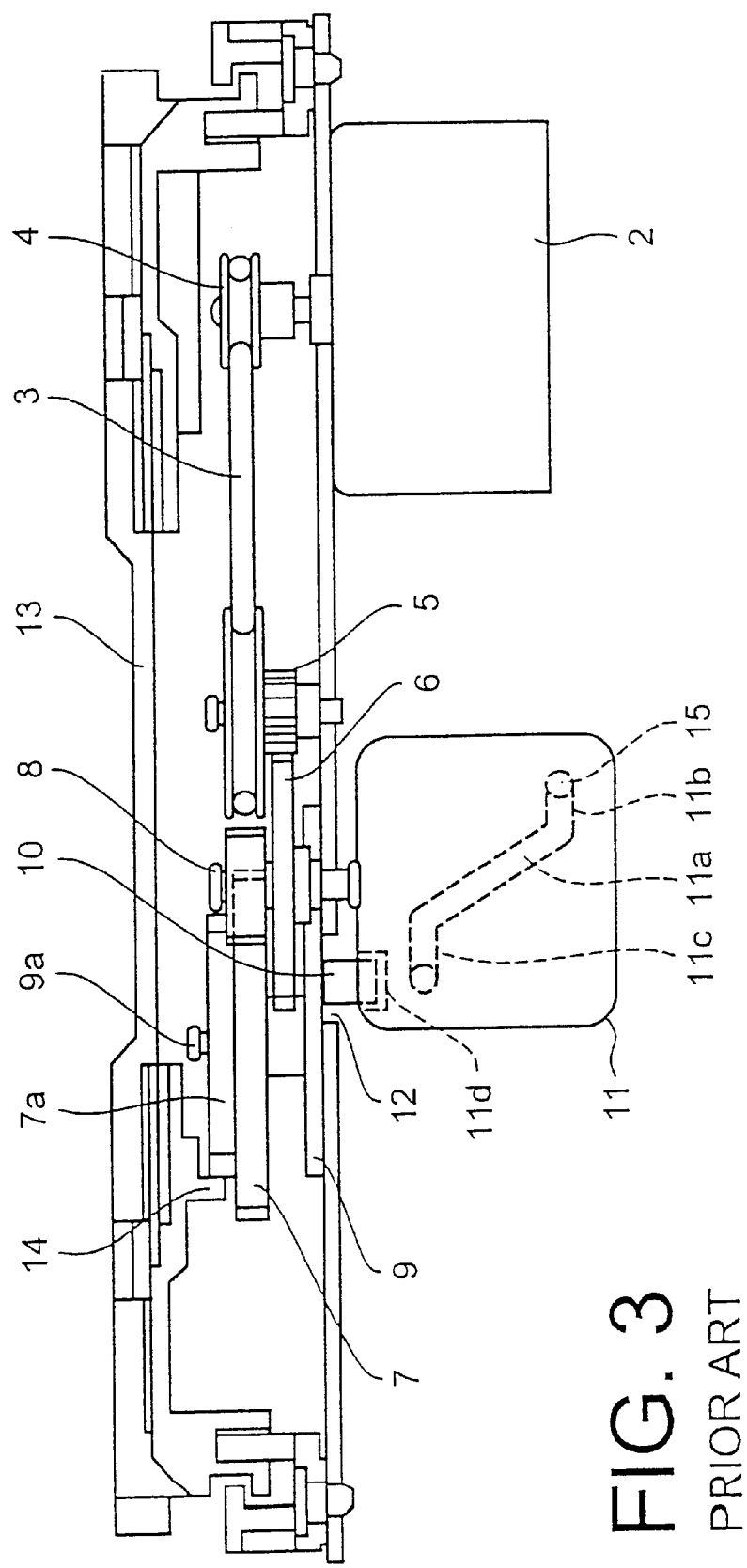
FIG. 3 is a schematic front view showing the conventional disk tray shifting device.
Figure 4C:
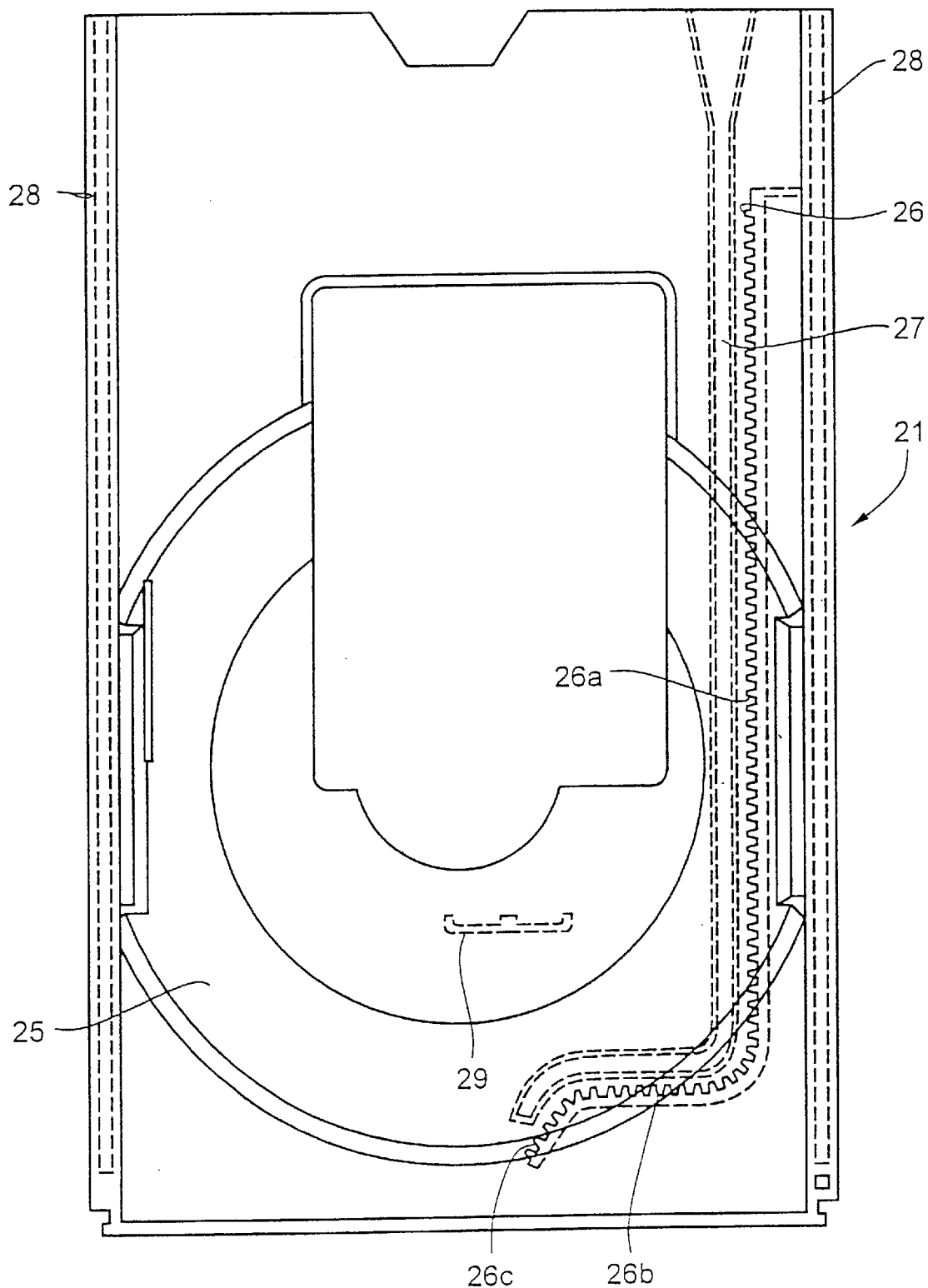

The present invention will now be described in detail with respect to an embodiment shown by the appended drawings.

Referring to FIG. 4A through FIG. 6, the disk tray shifting device in accordance with the present invention comprises a tray 21 for accommodating a disk, a bracket 22 having a loading motor 31 and a power transmission device, a circuit portion 23 mounted on one side of a main base 16, and an up-down pivoting base 24 supporting one side of a pickup base.

The tray 21, which is arranged on the main base 16, has a concave plate 25 for accommodating the disk, an L-shaped rack 26, a first guide groove 27, a second guide groove 28 and a stopper 29. The concave plate 25 and the L-shaped rack 26 are formed on the underside of the tray 21. The first guide groove 27 is extended on the underside of the tray 21 along the rack 26, and the first guide groove 27 has almost the same shape as the L-shaped rack 26. At the central portion of the concave plate 25, a stopper 29 is projected from the underside of the tray 21. The rack 26 includes a longitudinal rack 26a being extended along the longitudinal direction of the tray 21, a lateral rack 26b being extended along the cross direction of the tray, and a slanted rack 26c. The second guide grooves 28 are formed at both sides of the upper surface of the tray 21.

Figure 11A:
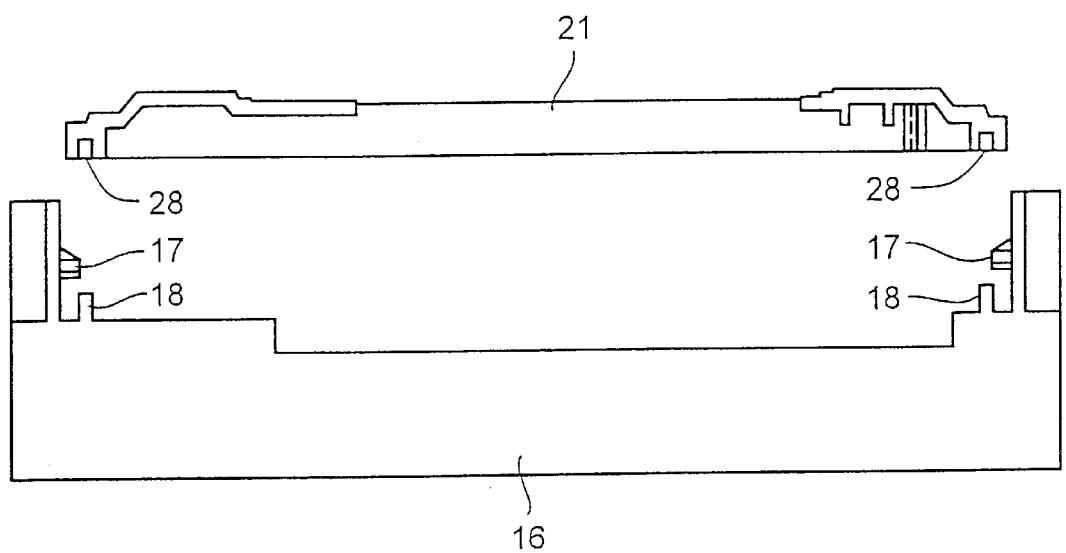
FIGS. 11A and 11B are schematic views illustrating the assembling structure between a main base and the disk tray.
Figure 11B:
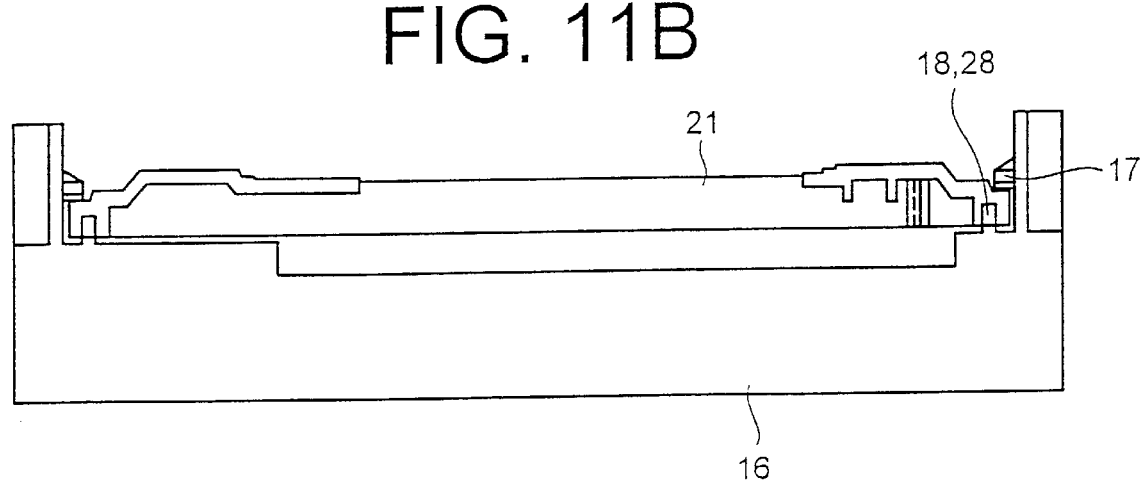

FIGS. 11A–11B are schematic views illustrating the assembling structure between the main base 16 and the tray 21. As shown in FIGS. 11A–11B, the second guide grooves 28 are engaged with protrusions 18 formed on the main base 16, and the upper side portions of the disk 21 contact the lower surfaces of protrusions 17 formed on each side of the main base when the main base 16 and tray 21 are engaged.

The bracket 22 is mounted movably on a guide bar 30 along the cross direction of the main base 16. The guide bar 30 is fixed in the vicinity of the front end portion of the main base 16. The loading motor 31 is mounted under the bracket 22, and a motor gear 33 is inserted on a motor shaft 32 which is projected upwards from the bracket 22. On the bracket 22, a first shaft 34 is formed integrally with the bracket 22 and is projected upwards from the upper surface of the bracket. The motor gear 33 is engaged with a large gear 35a of an intermediate gear 35, which is mounted rotatably on the first shaft 34.

On the lower portion of the first shaft 34, one end of an arm which has a second shaft 38 at the other end thereof is inserted rotatably, while an idler gear 36 is disposed on the second shaft 38. The idler gear includes a large gear 36a and a small gear 36b. The small gear 36b acts as a pinion engaging with the rack 26, and the large gear 36a is engaged with the small gear 35b of the intermediate gear 35. The upper end 38a of the second shaft 38 is extended above the idler gear 36.

Figure 5:
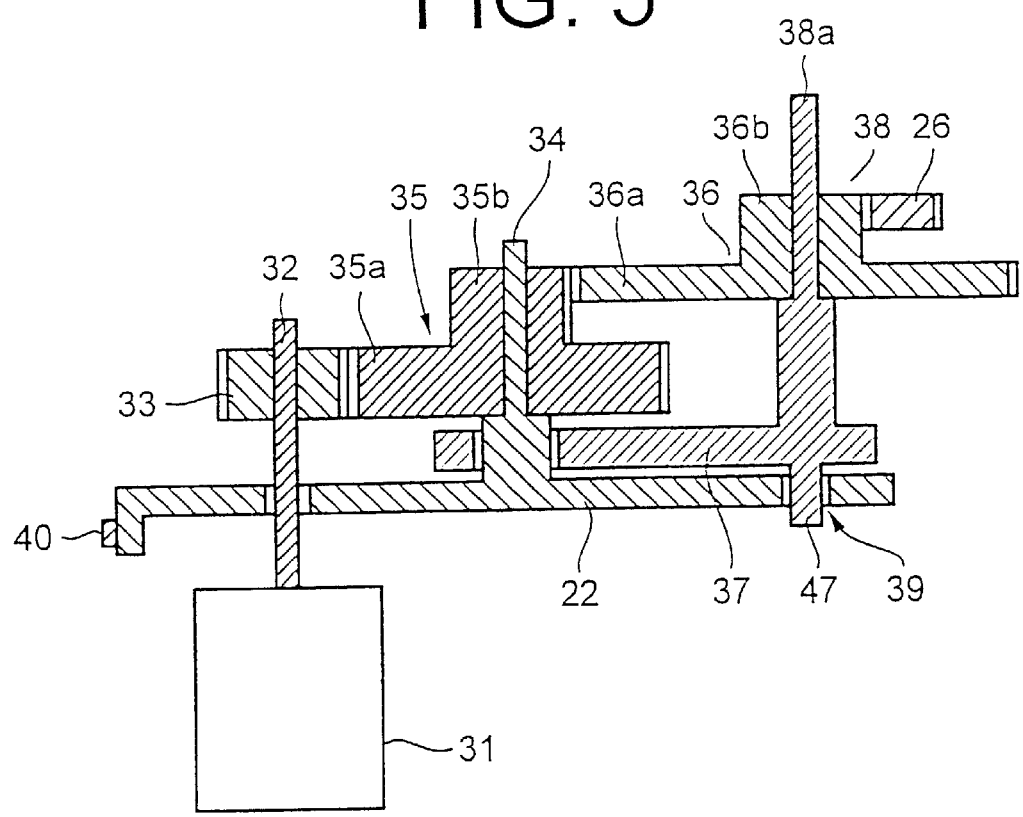
FIG. 5 is a cross-sectional view taken on lines 5A—5A in FIG. 4B.
Figure 6:
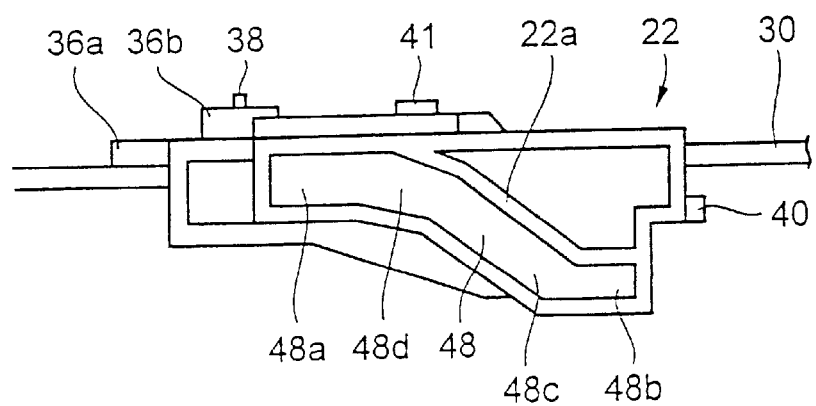
FIG. 6 is a rear view of a bracket shown in FIG. 4B.

Referring to FIG. 5, a guide protrusion 47 is extended from the second shaft 38, and is inserted into a guide slit 39 which is pierced on the right side of the bracket 22. On the left end of the bracket 22, there is formed a protrusion 40 for operating a switch disposed on the circuit portion 23. As shown in FIG. 6, a guide cam groove 48 is engraved on the rear surface of the bracket 22 and surrounded by a rib 22a, and a locking device 41 is projected from the upper end of the bracket 22.

Referring again to FIG. 4B, the circuit portion 23 is disposed on one side of the main base 16, and a position sensor for detecting the position of the bracket 22 is mounted on the circuit portion 23. In this embodiment, a push switch 43 is used as the sensor, the push switch 43 coming into contact with the protrusion 40 which is formed on the bracket 22. On the circuit portion 23, connecting members 42a and 42b are provided. A signal transmission device 42c for supplying the signals to the loading motor 31 is connected to the connecting member 42b, and a signal transmission device 42d for supplying the signals to the spindle motor (not shown), which is used to drive the turntable, is connected to the connecting member 42a. The circuit portion 23 is electrically connected to the control board disposed in the player body via a signal transmission member, not shown. In this embodiment, the flexible cables are used as the signal transmission device.

The up-down pivoting base 24 has a U-shape, and both shafts 44 thereof are secured rotatably to the main base 16. On the front end of the up-down pivoting base 24, there is formed a protrusion 45 which is engaged with the guide cam groove 48 of the bracket 22, as shown in FIG. 6. The up-down pivoting base 24 supports one side of the pickup base 46, and the shafts 44 are secured rotatably to the main base 16, so that the pickup base 46 moves upwards and downwards when the up-down pivoting base 24 is pivoted on the shafts 44.

The structures of the bracket 22 and the power transmission device, and the engaging relation between gears in a movable driving portion DP will be understood from FIG. 5 and FIG. 6.

As shown in FIG. 5, the driving force of the loading motor 31 is transmitted to the rack 26 by way of the intermediate gear 35 engaged with the motor gear 33, the idler gear 36 and the pinion formed integrally with the idler gear 36. The idler gear 36 inserted on the second shaft 38 of the arm 37 is rotated around the first shaft 34, and the rotating range is defined by the moving range of the protrusion 47 inserted in the guide slit 39. That is, the rotating range of the arm 37 is restricted by the piercing length of the guide slit 39.

Referring to FIG. 6, the guide cam groove 48 is engraved on the rear surface of the bracket 22. The protrusion 45 projected from the front side of the up-down pivoting base is inserted into the guide cam groove 48. The guide cam groove 48 includes an upper horizontal portion 48a, a lower horizontal portion 48b and a slant portion. The slant portion of the guide cam groove 48 includes a first slant portion 48c with steep slope and a second slant portion 48d with gentle slope.

Now the operation of the disk tray shifting device in accordance with the present invention will be described.

Figure 7B:
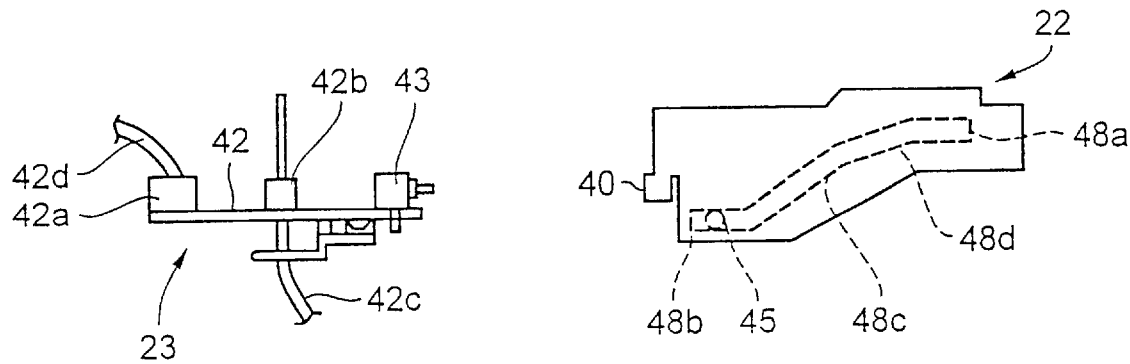
FIG. 7B is a schematic view illustrating the relative position between the bracket and the circuit portion of FIG. 7A.
Figure 7C:
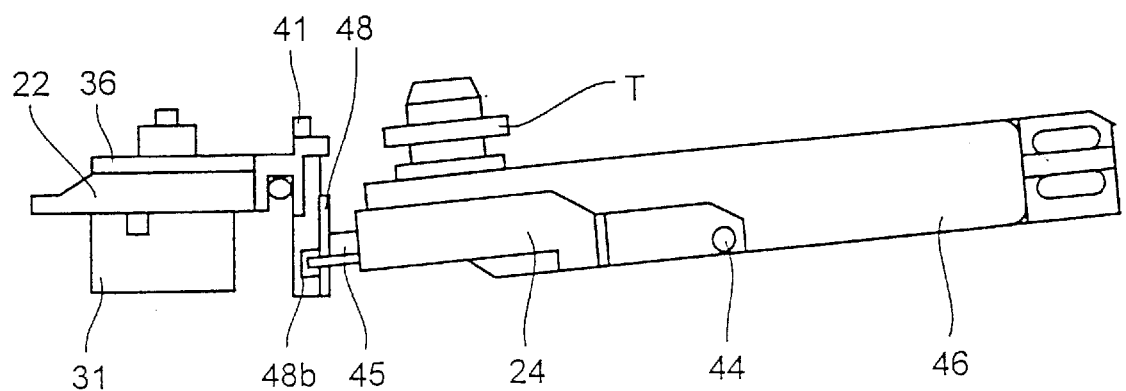
FIG. 7C is a side view of the bracket and the pickup base of FIG. 7A.

FIG. 7A is a schematic top view showing the unloading state of the disk tray shifting device, FIG. 7B is a view illustrating the relative position between the bracket 22 and the circuit portion 23, and FIG. 7C is a side view of the bracket 22 and the pickup base 46.

As shown in FIG. 7A, the bracket 22, including the loading motor 31 and the power transmission device is located at the right side of the main base 16 in the eject state. At this time, the pinion 36b of the idler gear 36 is engaged with the rear end portion of the longitudinal rack 26b, and the second shaft 38 is inserted into and guided by the first guide groove 27 of the tray 21. When the tray 21 is in the eject state, the protrusion 45 formed on the up-down pivoting base 24 is located in the lower horizontal portion 48b so that the front side of the pivoting base 24 keeps the down position.

Thereafter, when the disk is placed on the concave plate 25 of the tray 21 and the loading signal is applied to the disk tray shifting device, the loading motor 31 begins to rotate and the driving force of loading motor 31 is transmitted to the pinion 36b by way of the intermediate gear 35 and the idler gear 36. Since the pinion 36d is engaged with the rack 26, the tray 21 begins to shift toward the turntable along the arrow direction A.

Figure 8A:
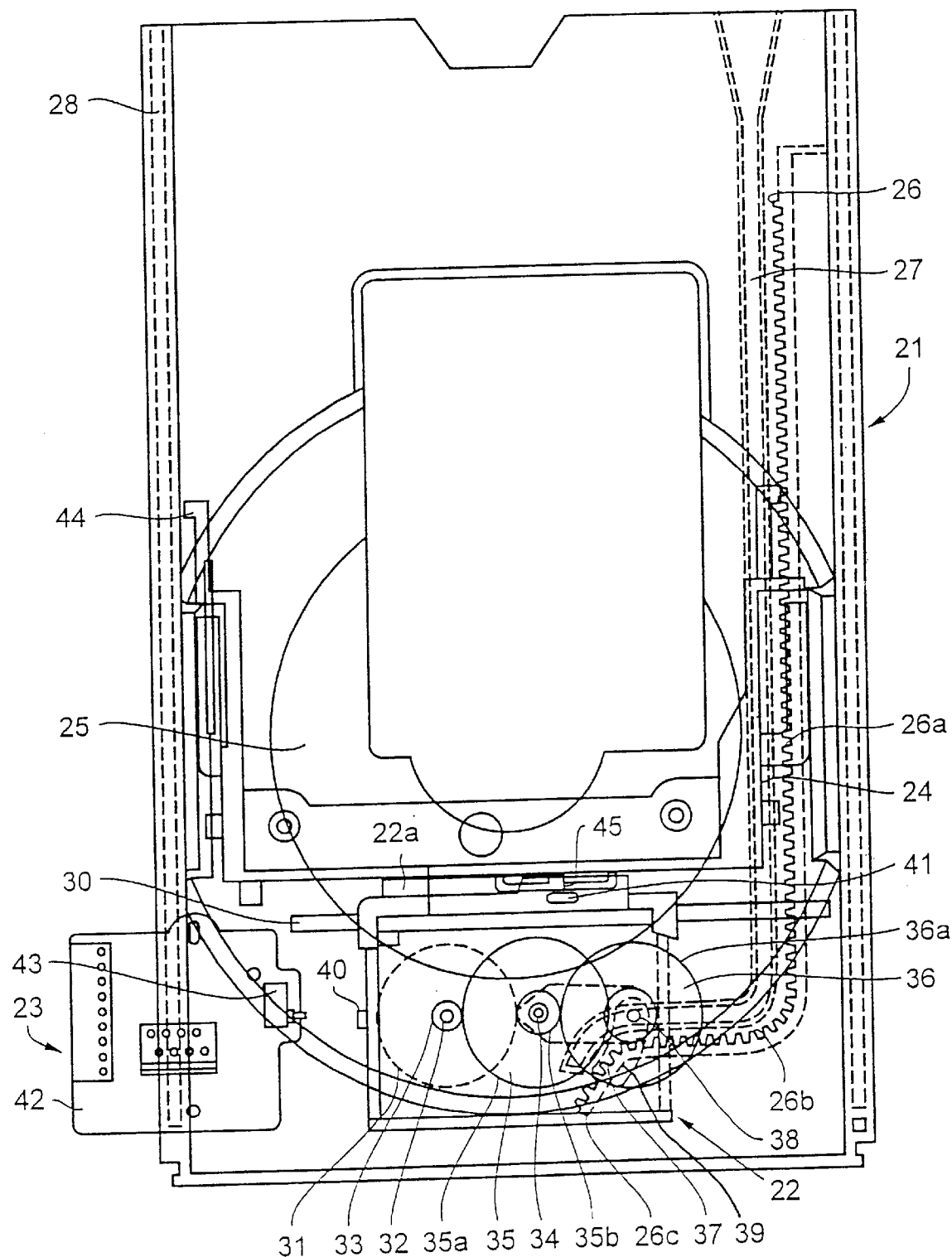
FIG. 8A is a schematic top view showing the progress of the loading operation of the disk tray shifting device in accordance with the present invention.

On the other hand, since the upper end 38a of the second shaft 38 is guided by the first guide groove 27 (see FIG. 7B), rotation of the arm 37 in which the idler gear 36 is mounted thereon is blocked so that rotation of the idler gear 36 is also blocked, and the bracket 22 is located at the right side of the main base. When the pinion 36b reaches the front end of the longitudinal rack 26a, the shifting operation of the tray 21 is stopped. Then, when the pinion 36b is continuously engaged with the lateral rack 26b by the continuous driving of the loading motor 31, the bracket 22 moves along the guide bar 30 in the cross direction. FIG. 8A shows the progress of the loading operation when the bracket 22 moves along the guide bar 30.

Figure 8B:
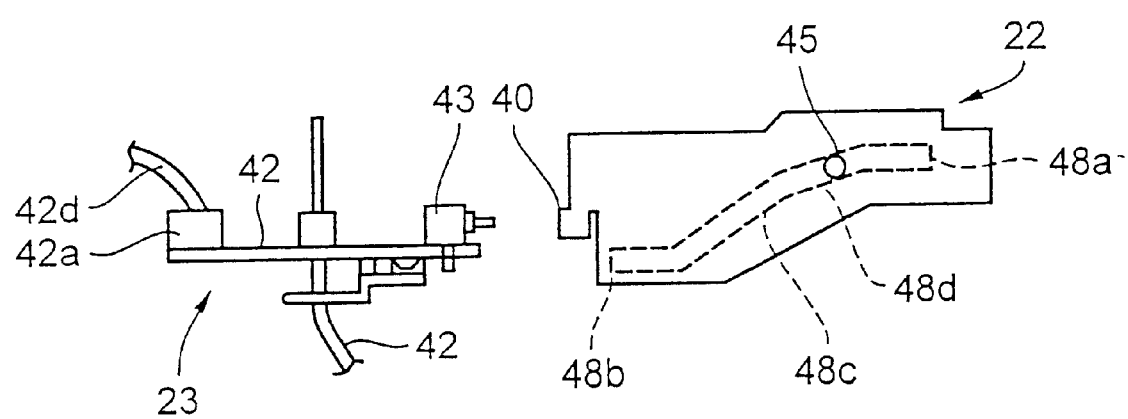
FIG. 8B is a schematic view illustrating the relative position between the bracket and the circuit of FIG. 8A.

As shown in FIG. 8B, since the bracket 22 moves along the arrow direction B as long as the pinion 36b is engaged with the lateral rack 26b and continues to rotate, the protrusion 45 inserted in the guide cam groove 48 of the bracket 22 passes through the first slant portion 48c with the steep slope and is located in the second slant portion 48d with the gentle slope so that the up-down pivoting base 24 begins to pivot upwards on the shafts 44.

On the other hand, when the protrusion 45 passes through the first slant portion 48c, the speed of the up-down pivoting base 24 increases because the disk does not come into contact with the turntable. But when the protrusion 45 passes through the second slant portion 48d, the disk comes into contact with the turntable. Thus, in order to place the disk on the turntable safely, the speed of the pivoting base 24 must be reduced. Thereafter, when the locking device 41 projected from the upper end of the bracket 22 comes into contact with the stopper 29 formed on the underside of the tray 21, the shifting of the tray 21 in the inverse direction of the arrow direction A is prevented. That is, the stopper 29 prevents the ejection of the tray 21 due to a careless mistake of the user or an external impact when the loading operation of the tray 21 is finished.

Thereafter, by the continuous rotation of the loading motor 21, the bracket 22 is continued to move in the arrow direction B as long as the pinion 36b moves on the slant rack 26c. When the pinion 36b begins to engage with the slanted rack 26c, the arm 37 including the idler gear 36 thereon is rotated clockwise on the first shaft 32. At this time, the guide protrusion 47 projected from the arm 37 is guided by the guide slit 39 formed on the bracket 22, and the upper end 38a of the second shaft 38 is guided by the first guide groove 27.

Figure 9A:
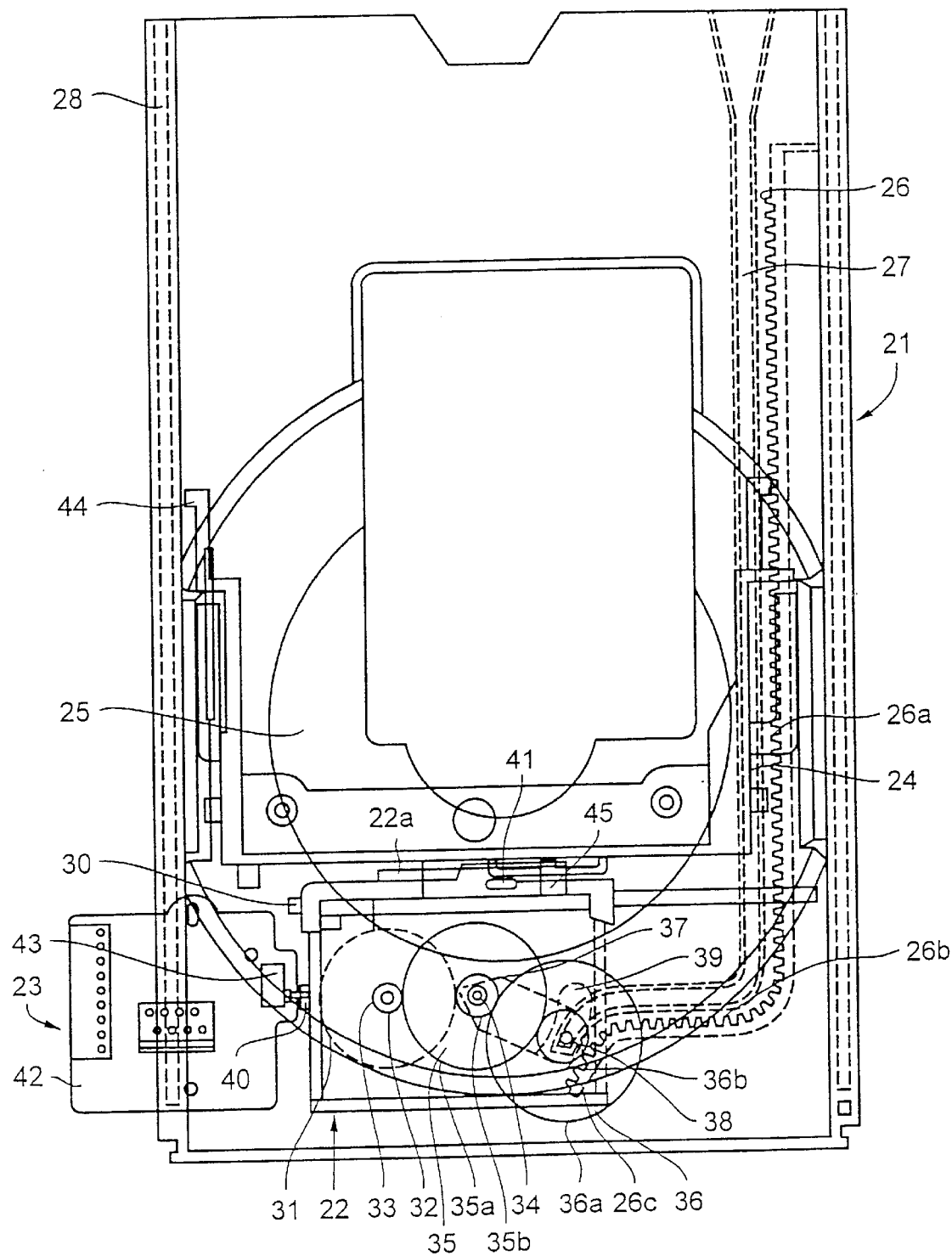
FIG. 9A is a schematic top view showing the complete state of the loading operation.
Figure 9B:
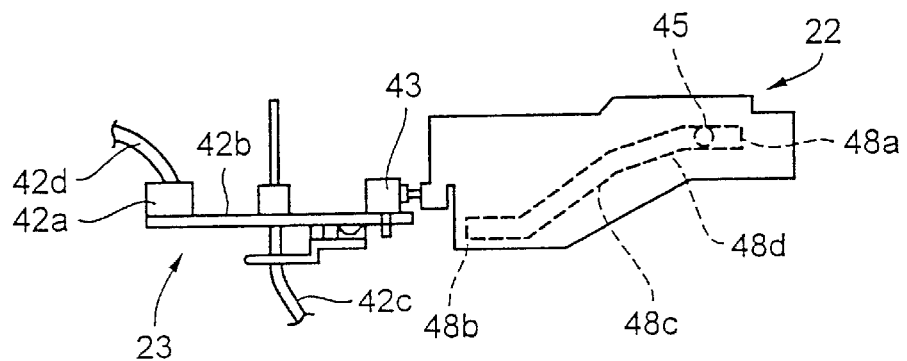
FIG. 9B is a schematic view illustrating the relative position between the bracket and the circuit portion of FIG. 9A.
Figure 9C:
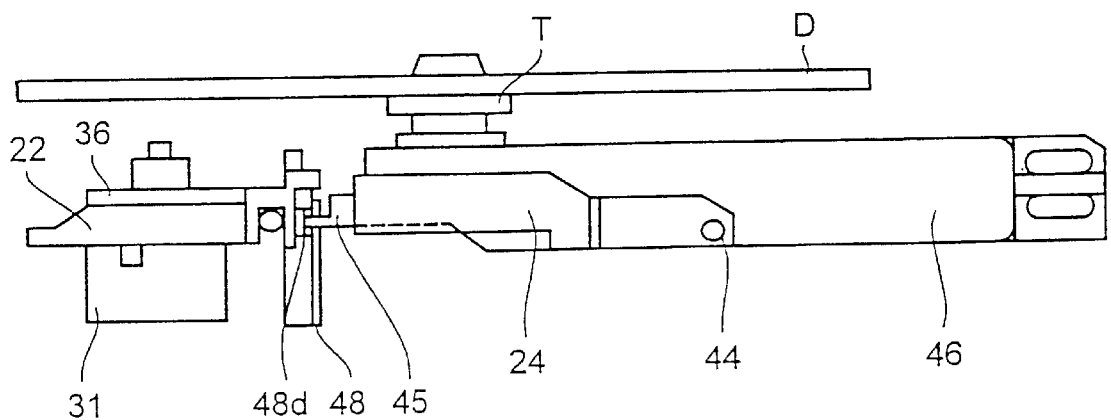
FIG. 9C is a side view of the bracket and the pickup base of FIG. 9A.
Figure 10A:
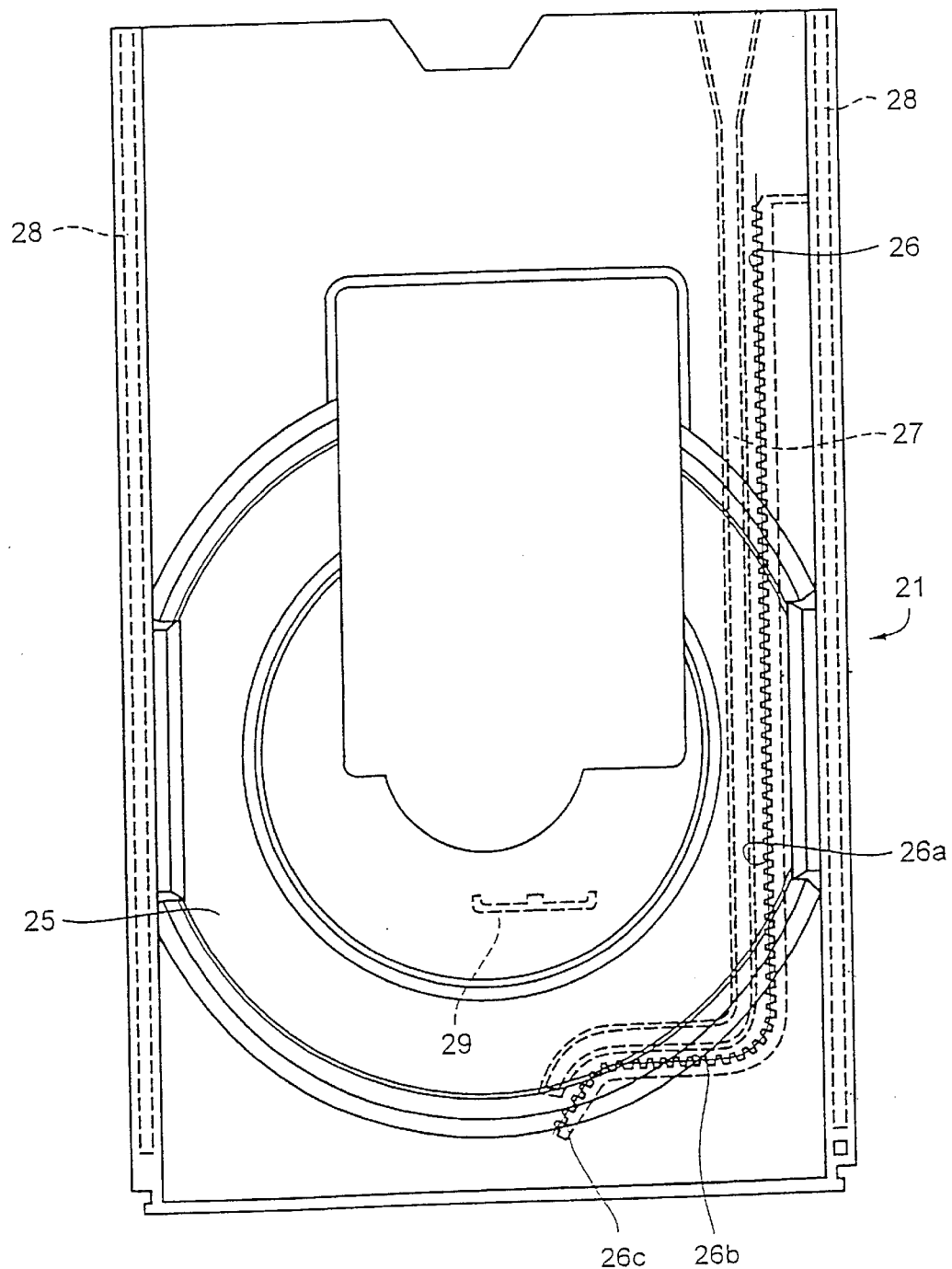
FIGS. 10A and 10B are a schematic top view and a front view of the disk tray, respectively.
Figure 10B:
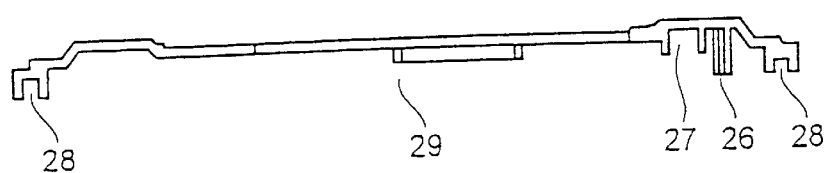

When the pinion 36b reaches the end of the slant rack 26c, the loading operation will be finished. FIG. 9A is a schematic top view showing the complete state of the loading operation, FIG. 9B is a schematic view illustrating the relative position between the bracket 22 and the circuit portion 23 after finishing the loading operation, and FIG. 9C is a side view of the bracket 22 and the pickup base 46. As shown in FIG. 9B, when the protrusion 40 of the bracket 22 comes into contact with the switch 43 mounted on the circuit portion 23, rotation of the loading motor 31 is stopped by the operation of the switch 43. As described above, when the pinion 36b reaches the end of the slant rack 26c, the slant rack 26c prevents the movement of the driving portion DP in the arrow direction B or the inverse direction of the arrow direction B.

At this time, since the protrusion 45 of the up-down pivoting base 24 is located in the upper horizontal portion 48a of the guide cam groove 48, the pivoting base 24 and the pickup base 46 are finished moving upward. Thus, the turntable is inserted into the center hole of the disk so that the disk is loaded on the turntable.

The unloading operation of the disk tray shifting device in accordance with the present invention is performed according to the reverse order of the loading operation.

According to the present invention as described above, it is possible to minimize the installation space of components by mounting the loading motor movable along the cross direction of the main base and to transmit the driving force of the loading motor to the disk tray effectively by minimizing power transmission stages.

Also, it is possible to construct the disk tray shifting device simply and compactly by installing the loading motor 31 and the power transmission means in a single bracket 22.

What is claimed is:

1. A disc tray locking device for an optical system, said disc tray locking device comprising:

a main base having a guide member;

an up-down pivoting base secured to said main base, said up-down pivoting base having a protrusion projecting from one end thereof;

a tray movable between a loaded position and an ejected position, said tray having a stopper formed on one side thereof; and a bracket movable along said guide member in at least a transverse direction with respect to a moving direction of said tray, said bracket having a guide cam groove engraved on one surface thereof, said guide cam groove being engaged with said protrusion of said up-down pivoting base, and said bracket having a locking portion which contacts said stopper for preventing further movement of said tray beyond said loaded position.

2. The disc tray locking device according to claim 1, wherein said locking portion is a protrusion projected from the upper side of said bracket.

3. The disc tray locking device according to claim 1, wherein said up-down pivoting base is lifted by a moving operation of said bracket.

4. The disc tray locking device according to claim 1, further comprising a motor for shifting said tray between the loaded position and the ejected position.

5. The disc tray locking device according to claim 4, wherein said bracket is moved by a driving force of said motor.

6. The disc tray locking device according to claim 1, wherein said up-down pivoting base includes a pickup unit and a spindle motor for driving a turntable.

7. A disc tray locking device for an optical system, said disc tray locking device comprising:

a main base having a guide member;

an up-down pivoting base secured to said main base, said up-down pivoting base having a protrusion projecting from one end thereof;

a tray movable between a loaded position and an ejected position, said tray having a stopper formed on one side thereof;

a bracket movable along said guide member in at least in a transverse direction with respect to a moving direction of said tray, said bracket having a guide cam groove engraved on one surface thereof, said cam guide groove being engaged with said protrusion of said up-down pivoting base; and a switch controlled between on and off positions based on a position of said bracket.

8. The disc tray locking device according to claim 7, wherein said switch is on/off controlled based on said position of said bracket which is varied when said protrusion moves along said guide cam groove.

9. The disc tray locking device according to claim 7, wherein said switch is on/off controlled based on said position of said bracket which is varied when said bracket moves along said guide member.

10. The disc tray locking device according to claim 7, wherein said up-down pivoting base is lifted by a moving operation of said bracket.

11. The disc tray locking device according to claim 7, further comprising a motor for shifting said tray between the loaded position and the ejected position.

12. The disc tray locking device according to claim 11, wherein said bracket is moved by a driving force of said motor.

13. The disc tray locking device according to claim 7, wherein said up-down pivoting base includes a pickup unit and a spindle motor for driving a turntable.

14. A disc tray locking device for an optical system, said disc tray locking device comprising:

a main base having a guide member;

an up-down pivoting base secured to said main base, said up-down pivoting base having a protrusion projecting from one end thereof;

a tray movable between a loaded position and an ejected position, said tray having a stopper formed on one side thereof;

a bracket movable along said guide member in at least a transverse direction with respect to a moving direction of said tray, said bracket having a locking portion which contacts said stopper for preventing further movement of said tray beyond said loaded position; and a switch controlled between on and off positions based on a position of said bracket.

15. The disc tray locking device according to claim 14, wherein said switch is on/off controlled based on said position of said bracket which is varied when said bracket moves along said guide member.

16. The disc tray locking device according to claim 14, wherein said locking portion is a protrusion projected from the upper side of said bracket.

17. The disc tray locking device according to claim 14, wherein said up-down pivoting base is lifted by a moving operation of said bracket.

18. The disc tray locking device according to claim 14, further comprising a motor for shifting said tray between the loaded position and the ejected position.

19. The disc tray locking device according to claim 18, wherein said bracket is moved by a driving force of said motor.

20. The disc tray locking device according to claim 14, wherein said up-down pivoting base includes a pickup unit and a spindle motor for driving a turntable.

* * * * *